March 8, 1949.　　　E. J. DECKER　　　2,463,954
FILTER
Filed Sept. 4, 1945　　　　　　　　2 Sheets-Sheet 1
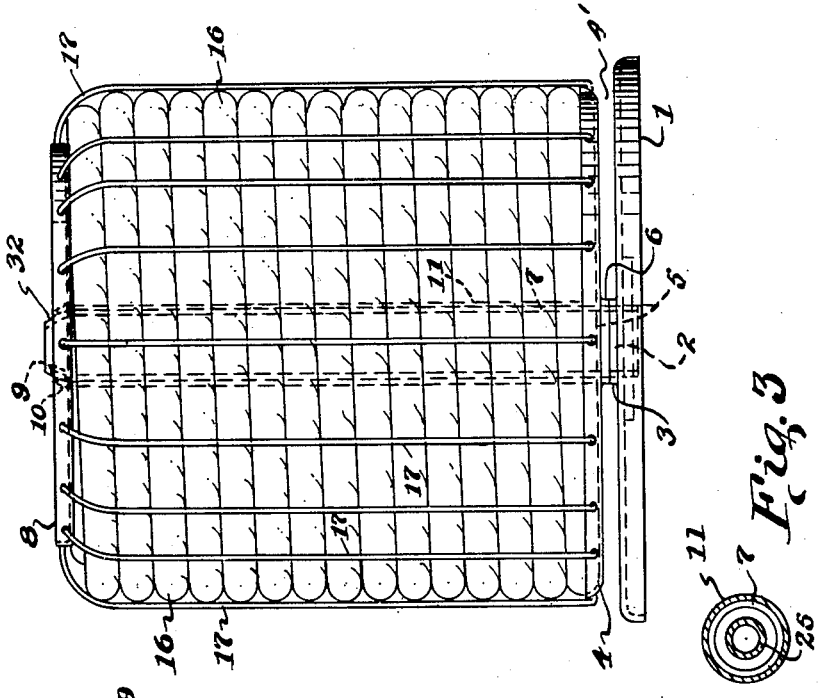
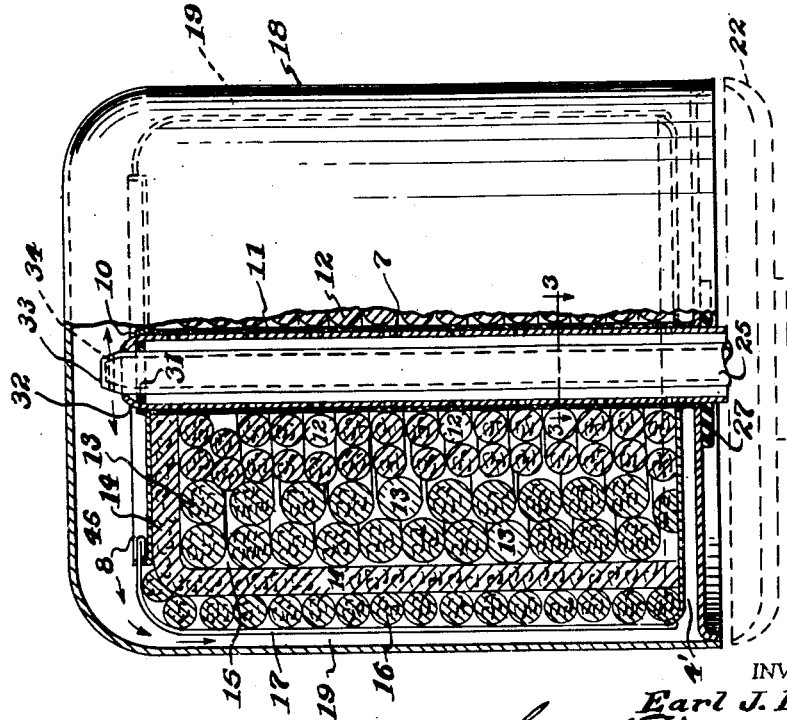
INVENTOR.
Earl J. Decker
BY Samuel Weisman
Attorney March 8, 1949.  E. J. DECKER  2,463,954
FILTER
Filed Sept. 4, 1945  2 Sheets-Sheet 2
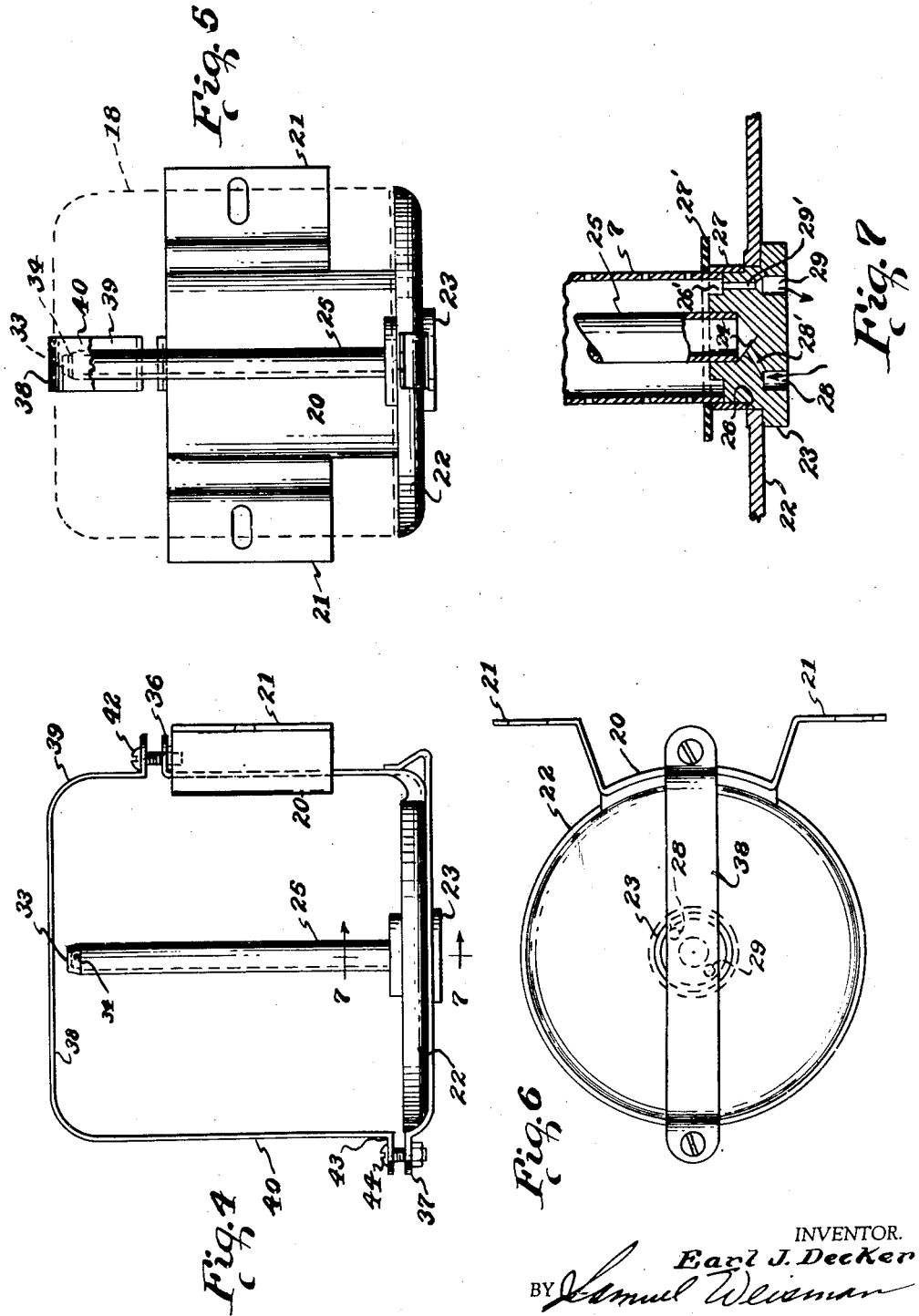
INVENTOR.
Earl J. Decker
BY Samuel Weisman
Attorney Patented Mar. 8, 1949

2,463,954

UNITED STATES PATENT OFFICE 2,463,954

FILTER

Earl J. Decker, Detroit, Mich.

Application September 4, 1945, Serial No. 614,179

1 Claim. (Cl. 210—204)

The present invention pertains to a novel filter designed primarily for filtering lubricating oil while being circulated through the crankcase of a motor.

Ordinarily such a filter comprises a cartridge which is separable from its enclosure or case. When the cartridge is no longer useful, it is removed and discarded and replaced by another. This operation, in which the removed and uncovered cartridge must be handled, is a dirty one and is usually performed in a service station.

The object of the present invention is to simplify the renewal of the cartridge so that it is not such a dirty job and can be done on the premises of the automobile owner or driver. In the accomplishment of this object, the case is permanently secured to the cartridge and is necessarily discarded therewith. The case, secured to the cartridge, is mounted on the motor block by a simple clamp. The objectionable feature of the conventional operation, namely the removal of the cartridge from its case, is thereby eliminated. Although the discarding of the case represents an expenditure of a few cents, this is more than overcome by the saving in time and labor.

The cartridge itself includes a tube surrounded by filtering material and enclosing a pipe spaced therefrom. Although the oil may flow through the filtering material either inwardly or outwardly as desired, it may be assumed that the flow is inward toward the tube and that the oil is supplied through the pipe which discharges upon the outer surface of the filtering material. The invention also includes a novel manner of winding the filtering material around the tube. Ordinarily the material is wound circumferentially. According to the invention, however, at least one intermediate winding of the filtering material is directed transversely of the circumferential windings or lengthwise of the central tube. The adjacent windings which are transverse of each other form pockets for the accumulation of sludge. The clogging of the smaller interstices is thereby avoided, and the flow of oil is smoother and faster.

The invention is fully disclosed by way of example in the following description and in the accompanying drawings in which:

Figure 1 is a longitudinal section of the device, partly in elevation;

Figure 2 is an elevation of the cartridge without the case;

Figure 3 is a section on the line 3—3 of Figure 1;

Figure 4 is an elevation of the mounting bracket, showing the base of the filter supported therein;

Figure 5 is a similar vertical elevation at right angles to Figure 4;

Figure 6 is a corresponding plan view, and

Figure 7 is a section on the line 7—7 of Figure 4.

Reference to these views will now be made by use of like characters which are employed to designate corresponding parts throughout.

As already indicated, the cartridge and case are furnished as an inseparable unit, the cartridge being assembled first and then inserted and secured into the case. The bottom member of the cartridge assembly is a downwardly dished base member 1 which becomes the bottom of the case. The base is formed with a center hole 2 around which the metal is flanged upwardly at 3. The bottom of the cartridge frame is an upwardly dished member 4 having an equal center hole 5 where the metal is flanged downwardly at 6 to coincide with the flange 3. A metal tube 7 is passed through the coinciding holes 2, 5, with its lower end received in the holes. This end is secured to the flanges in any desired manner, as by welding, and the flanges may moreover be secured to one another if desired. The tube 7 is perforated to receive filtered oil in the manner presently to be described.

On the upper end of the tube 7 is mounted a dished top member 8 having a central hole 9 which receives the tube and having the metal around the hole flanged upward and somewhat inward at 10 to conform to the shape of a pipe to be inserted therein.

A suitable filter cloth 11 is wrapped around the tube 7 as shown in Figure 1. A rope or cord of milkweed cloth is wound circumferentially around the tube 7 in a desired number of windings as indicated by the numeral 12. In like manner, jute rope or cord is wound around the windings 12 in the desired number of layers, as indicated by the numeral 13. The next layer consists of a rope or cord composed of jute and milkweed wound around the windings 13 transversely thereof or lengthwise of the tube 7, as indicated by the numeral 14. The windings 14 traversing the windings 13 form pockets or recesses 15 for the accumulation of material filtered out of the oil. As a result of this method of winding, the filtering material is not packed as closely as if all the windings were in the same direction, and the flow through the cartridge is considerably faster. Finally, another rope or cord 16 is wound circumferentially around the material 14. The cord 16 may consist of jute or milkweed floss. The mass is held together by wires 17 threaded through the members 4 and 8 in suitably spaced strands which are preferably arranged in parallel relation. A case 18 of substantially cylindrical form enclosed at one end is now fitted over the assembled cartridge and its lower or open end is permanently secured to the downward flange of the base member 1 by welding or other suitable means. It will be seen that a space 19 is retained between the case and the outer wires 17 of the assembled cartridge for a purpose that will presently appear.

The filter is completed by means of a mounting bracket 20 having slotted side wings 21 adapted for fastening to a fixed structure such as an engine block. From the lower end of the bracket extends perpendicularly a circular bottom plate 22 on which the case 18 is adapted to rest, as will presently be shown.

A fitting 23 is press fitted in the center of the plate 22 and is formed at its upper end with a circular recess 24 in which is mounted the lower end of a pipe 25 disposed within the tube 7 and spaced annularly therefrom. On the inner side of the plate 22, the fitting is reduced in diameter to form a shoulder 26 in which is mounted a ring 27 receiving the lower end of the tube 7. A suitable gasket 27' surrounds the lower end of the tube 7 and seats on the ring 27. Within the lower end of the tube 7, the fitting 23 is formed with a marginal channel 26' of ample width to insure reception of the tube 7.

In the bottom of the fitting 23 are formed inlet and outlet openings 28 and 29 respectively, suitably tapped for connection to the approximate pipe lines. The inlet opening 28 is connected by a duct 28' to the central hole 24 and thus to the pipe 25. The opening 29 is similarly connected by a duct 29' to the channel 26' and thus to the space between the tube 7 and pipe 25.

The pipe 25 passes through the hole 9 in the top member 8 of the cartridge assembly. The pipe which is of smaller diameter than the tube 7, is packed in the upper end of the tube by a suitable seal or washer 31, and the tube is shaped at 32 into contact with the portion of the pipe over the seal 31 but below the upper extremity of the pipe. The upper end of the pipe is closed at 33 and is formed with lateral apertures 34 above the tube 7.

An ear 36 extends outwardly from the midpoint of the upper edge of the bracket 20. A similar ear 37 extends outwardly from an opposite point on the supporting plate 22. A clamp fastened to the ears secures the case and cartridge upon the mounting bracket plate 22. The securing strap 38 of the clamp is of somewhat U-shape with one leg 39 considerably shorter than the other leg 40. The leg 39 is formed with an outwardly extending ear 41 adapted to coincide with the ear 36 and fastened thereto by a bolt and nut 42. Similarly the leg 40 has an outwardly extending ear 43 coinciding with the ear 37 and fastened thereto by a bolt and nut 44. To release the cartridge case, the bolt and nut 42 are loosened and the V-shaped member 39, 40 is merely swung laterally on the bolt as a pivot.

In the use of the device, the aperture 28 is connected by suitable piping to the source of oil to be filtered, such as the crankcase of a motor vehicle. The oil flows into the pipe 25 and sprays out through the apertures 34 at the upper end thereof, into the space 45 between the top of the case 18 and the top member 8. From here the oil is forced into the annular space 19 from which it can flow only through the filter windings 12, 13, 14, 15 and 16 to the filter cloth 11 and the apertures of the tube 7. The sludge collects in the space 4' between the members 1 and 4. From the interior of the tube the filtered oil flows to the opening 29, which is suitably piped to the lubricating system. It will be understood in this connection that a pump may be incorporated into the lubricating system as well known in the art, and such a pump induces the flow previously described.

When the filter has become clogged or fouled, the strap 38 is released and the cartridge with its case 18 is discarded to be replaced by a new cartridge and case. This method is to be distinguished in which the cartridge is discarded and the case is retained. The removal of the cartridge from the case and the insertion of the new cartridge is a dirty operation and is usually done at a service station. The construction described herein, requiring only the loosening of the strap 38, can be done by the owner or the driver of the automobile on his own premises. The discarded case costs a few cents more than the cartridge alone but this amount is repaid by the saving of time and labor costs.

Although a specific embodiment of the invention has been illustrated and described, it will be understood that various alterations in the details of construction may be made without departing from the scope of the invention as indicated by the appended claim.

What I claim is:

A filter cartridge comprising an apertured tube, filtering cord wound circumferentially around said tube, filtering cord wound over the first cord and perpendicularly thereto, and filtering cord wound around the second cord and circumferential of the tube.

EARL J. DECKER.

REFERENCES CITED

The following references are of record in the file of this patent:

UNITED STATES PATENTS

| Number | Name | Date |
|---|---|---|
| Re. 22,651 | Hastings et al. | June 12, 1945 |
| 1,646,377 | Sweetland et al. | Oct. 18, 1927 |
| 1,731,209 | Champion | Oct. 8, 1929 |
| 1,741,672 | Arnold | Dec. 31, 1929 |
| 1,830,742 | McKinley | Nov. 3, 1931 |
| 1,913,401 | Lidell | June 13, 1933 |
| 2,059,358 | Johnson et al. | Nov. 3, 1936 |
| 2,197,352 | Decker | Apr. 16, 1940 |
| 2,253,684 | Burckhalter | Aug. 26, 1941 |
| 2,277,737 | Wilkinson | Mar. 31, 1942 |
| 2,337,470 | Hill | Dec. 21, 1943 |